（12）United States Patent
Nose

(10) Patent No.: US 11,774,584 B2
(45) Date of Patent: Oct. 3, 2023

(54) IMAGE GENERATING DEVICE AND METHOD FOR RADAR

(71) Applicant: Furuno Electric Co., Ltd., Nishinomiya (JP)

(72) Inventor: Masaya Nose, Nishinomiya (JP)

(73) Assignee: Furuno Electric Co., Ltd., Nishinomiya (JP)

( * ) Notice: Subject to any disclaimer, the term of this patent is extended or adjusted under 35 U.S.C. 154(b) by 281 days.

(21) Appl. No.: 17/231,201

(22) Filed: Apr. 15, 2021

(65) Prior Publication Data

US 2022/0334248 A1    Oct. 20, 2022

(51) Int. Cl.
| | |
|---|---|
| G01S 13/937 | (2020.01) |
| G01S 7/04 | (2006.01) |
| G01S 7/32 | (2006.01) |
| G01S 13/89 | (2006.01) |

(52) U.S. Cl.
CPC .............. *G01S 13/937* (2020.01); *G01S 7/04* (2013.01); *G01S 7/32* (2013.01); *G01S 13/89* (2013.01)

(58) Field of Classification Search
CPC . G01S 13/937; G01S 7/04; G01S 7/32; G01S 13/89; G01S 7/066
See application file for complete search history.

(56) References Cited

U.S. PATENT DOCUMENTS

| | | | | |
|---|---|---|---|---|
| 2011/0205104 A1* | 8/2011 | Nakagawa | ................ | G06T 5/50 342/118 |
| 2011/0235939 A1* | 9/2011 | Peterson | ................... | G06T 7/12 382/266 |

FOREIGN PATENT DOCUMENTS

| | | | | |
|---|---|---|---|---|
| JP | 2633802 B2 | 7/1997 | | |
| JP | 2018072282 A | * | 5/2018 | ......... G01S 13/9094 |

OTHER PUBLICATIONS

JP_2018072282_A_I_translate.pdf—translation of JP2018072282A (Year: 2018).*
Image registration—Wikipedia.pdf from https://web.archive.org/web/20201112031306/http://en.wikipedia.org:80/wiki/Image_registration (Year: 2020).*
G. A. Rolfe, "Radar image overlay on an ECDIS system—an overview," Proceedings of Position, Location and Navigation Symposium—PLANS '96, Atlanta, GA, USA, 1996, pp. 130-136, doi: 10.1109/PLANS.1996.509067. (Year: 1996).*

* cited by examiner

*Primary Examiner* — Bernarr E Gregory
*Assistant Examiner* — Yonghong Li
(74) *Attorney, Agent, or Firm* — Alleman Hall Creasman & Tuttle LLP

(57) ABSTRACT

An image generating device for a radar includes a receiving module configured to receive a radar signal from an antenna and process the radar signal to generate an echo, an edge image generator configured to generate an edge echo image based on the echo acquired at a first time instance, a projected image generator configured to generate a projected echo image based on the echo acquired at a second time instance, and a superimposition generator configured to superimpose the edge echo image on the projected echo image based on the first and second time instances, to generate a superimposed echo image.

19 Claims, 9 Drawing Sheets

400

500

600

IMAGE GENERATING DEVICE AND METHOD FOR RADAR

TECHNICAL FIELD

The present disclosure relates to image processing for a radar, and more particularly to image generating device and method for a radar.

BACKGROUND

The marine equipment radars are generally required to detect collision risks with other ships and obstacles, as well as to detect birds or flock of birds that prey on fish in water. Conventional marine equipment radars display echo images obtained by signal processing on the basis of reflected waves from objects around their ship in a plane. The displayed echo image indicates a current scan around the ship, wherein the current scan includes an object echo image displayed in a plane. The marine equipment radars further support an echo trail function that displays an echo motion, i.e., a positional history of a previous echo, of an object obtained in a previous scan by superimposing on a two-dimensional plane. Thus, by utilizing the conventional echo trail function, a user is unable to recognize a change in a shape and a size of the object echo in time series, like detection of collision risks and the flock of birds. In order to detect collision risks and the flock of birds, it is necessary to monitor echo information of past several scans to recognize a change in the object echo. A change in the object echo indicates whether the object is moving. However, the marine equipment radars are unable to detect a change in a shape and a size of the object echo with time using one scan or the echo trail function.

In a known technique, an echo observer continuously monitors the echo displayed in a plane that is updated after every scan, and recognizes the change with respect to time such as the shape and size of the object. In another known technique, a method of holding echo images obtained by the past scans and switching to the display of the past echoes by a user is utilized, or a display method of projecting and displaying the echoes in a three-dimensional space is utilized. However, these methods utilize a large amount of memory for storing past echoes and also require a two-screen display. Further, to project and display the echoes in the three-dimensional space, a large amount of calculation is required when each point in three dimensions is prospectively projected in two dimensions.

Hence, there is a need to improve a processing speed and memory usage of the marine equipment radars to monitor change in object echoes without impairing collision avoidance performance.

SUMMARY

In an embodiment of the present disclosure, there is provided an image generating device for a radar that includes a receiving module, an edge image generator, a projected image generator, and a superimposition generator. The receiving module is configured to receive a radar signal from an antenna and process the radar signal to generate an echo. The edge image generator is configured to generate an edge echo image based on the echo acquired at a first time instance. The projected image generator is configured to generate a projected echo image based on the echo acquired at a second time instance. The superimposition generator is configured to superimpose the edge echo image on the projected echo image based on the first and second time instances, to generate a superimposed echo image.

Additionally, or optionally, the superimposition generator is further configured to arrange the edge echo image and the projected echo image on a time axis at the first time instance and the second time instance, respectively, to generate the superimposed echo image.

Additionally, or optionally, the edge echo image includes at least one transparent image with enhanced edges.

Additionally, or optionally, the projected image generator is further configured to generate a current echo image based on the echo acquired at the second time instance, and project the current echo image with respect to a predefined perspective projection angle, to generate the projected echo image.

Additionally, or optionally, the image generating device further includes a display parameter holding module configured to store at least one of: the predefined perspective projection angle, a past echo interval indicating a time interval between the first and second time instances, a pooling information of the edge image generator, image dimensions of the edge and projected echo images, an echo distance between the arrangement of the edge and projected echo images on the time axis, a set of projection transformation coordinates associated with the projected echo image, and a set of projection transformation matrices associated with the projected echo image.

Additionally, or optionally, the superimposition generator is further configured to replace the edge echo image with the superimposed echo image after generating the superimposed echo image.

Additionally, or optionally, the projected echo image includes the current echo image that is projected with respect to the predefined perspective projection angle on a perspective projection plane based on the set of projection transformation matrices.

Additionally, or optionally, the edge image generator includes a past echo pooling module that is configured to store the edge echo image as a previous pooled echo image, generate a current transparent image of the projected echo image using edge extraction, combine the previous pooled echo image with the current transparent image to generate a current pooled echo image, such that the current pooled echo image includes a plurality of extracted edges of a plurality of previous echoes acquired at a corresponding plurality of previous time instances, and using the current pooled image for superimposing on a next echo image acquired at a time instance next to the second time instance.

Additionally, or optionally, a luminance value associated with the previous pooled echo image is less than a luminance value associated with the current transparent image.

Additionally, or optionally, the past echo pooling module combines the previous pooled echo image, and the current transparent image, based on an alpha blending technique.

Additionally, or optionally, the current pooled image includes edge information of at most N number of previous echoes.

Additionally, or optionally, the image generating device further includes a display module configured to display the superimposed echo image.

Additionally, or optionally, the image generating device further includes a time calculator configured to determine the first and second time instances.

In another aspect of the present disclosure, there is provided an image generating method for a radar that includes receiving a radar signal from an antenna, processing the radar signal to generate an echo, generating an edge echo image based on the echo acquired at a first time instance, generating a projected echo image based on the echo acquired at a second time instance, and superimposing the edge echo image on the projected echo image based on the first and second time instances, to generate a superimposed echo image.

In yet another aspect of the present disclosure, there is provided a non-transitory computer readable medium having stored thereon computer-executable instructions which, when executed by a computer, cause the computer to receive a radar signal from an antenna, process the radar signal to generate an echo, generate an edge echo image based on the echo acquired at a first time instance, generate a projected echo image based on the echo acquired at a second time instance, and superimpose the edge echo image on the projected echo image based on the first and second time instances, to generate a superimposed echo image.

The problem of not being able to monitor a change in an object echo without requiring high memory and a large number of calculations, and without impairing collision avoidance performance is solved by displaying information for the past several scans superimposed on a conventional planar display echo. Further, an effective superposition method is utilized to improve a processing speed and reduce memory usage.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein:

DETAILED DESCRIPTION

Figure 1:
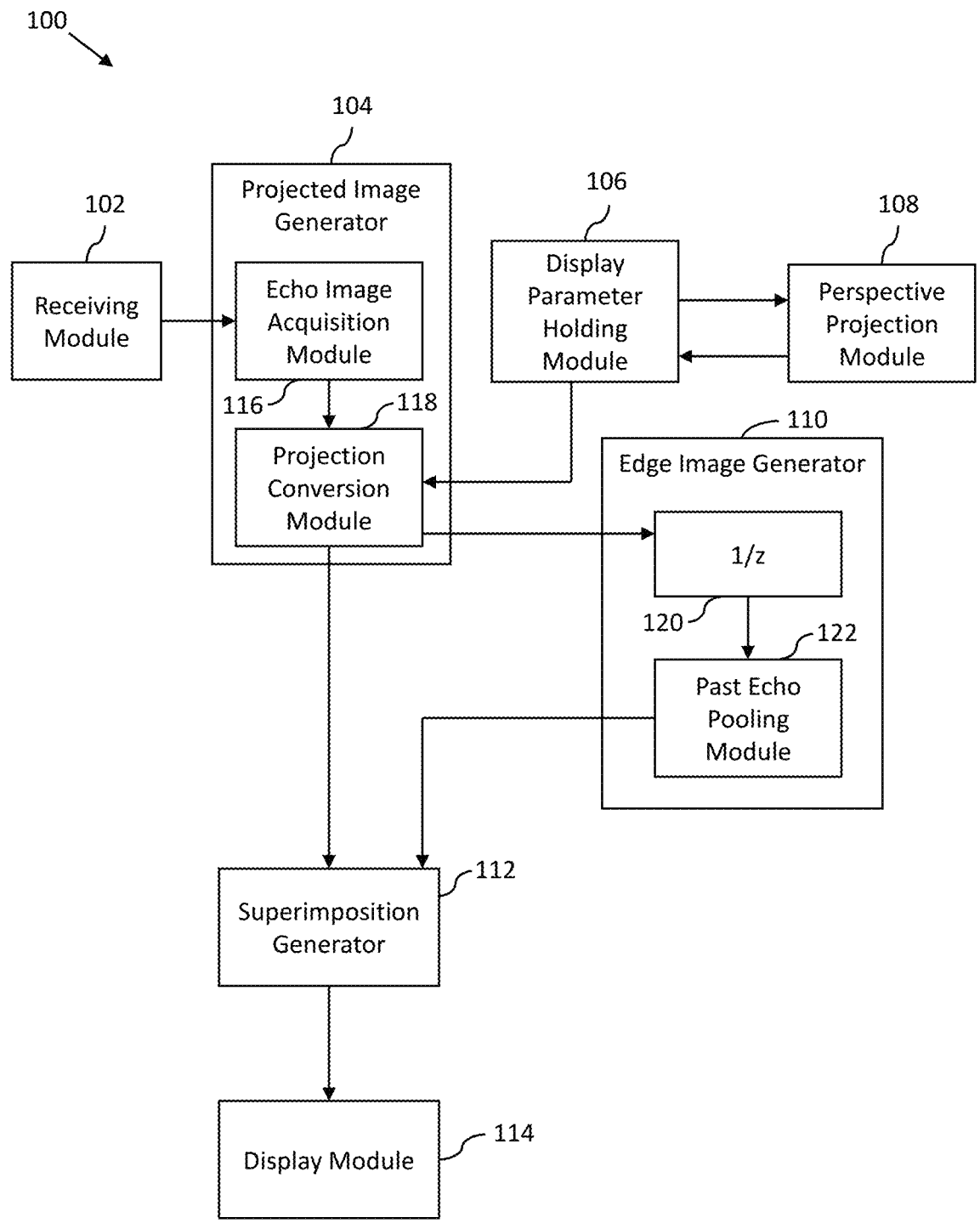
FIG. 1 is a block diagram of an image generating device, in accordance with an embodiment of the present disclosure.

Example apparatus are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

FIG. 1 is a block diagram of an image generating device 100, in accordance with an embodiment of the present disclosure. In one embodiment, the image generating device 100 may be operably coupled to a radar installed on a water vessel to detect collision risks with other ships and obstacles, as well as to detect birds that prey on fish in water, by generating images pertaining to changes in object echo of one or more surrounding objects. Examples of the water body include, but are not limited to, a sea, a river, a lake and the like, and examples of the water vessel include, but are not limited to, a fishing boat, a ship, a hovercraft and the like. The water vessel may be disposed in the water body for the purpose of carrying travellers and goods across locations, or for the purpose of deep sea fishing. In the context of the present disclosure, the water vessel may be hereinafter also referred to as ship.

In an embodiment of the present disclosure, the image generating device 100 includes a receiving module 102, a projected image generator 104, a display parameter holding module 106, a perspective projection module 108, an edge image generator 110, a superimposition generator 112, and a display module 114.

The receiving module 102 is operably coupled to an antenna (not shown) of the radar. In a typical radar, the antenna converts a high-power transmission signal into a transmission wave, transmits the transmission wave towards targets, receives reflection waves from targets, and converts the reflection waves into electric signals. In the context of the present disclosure, such electric signals are hereinafter also referred to as radar signals. Examples of the targets include, but are not limited to other vessels, land mass, birds, etc.

The receiving module 102 receives the radar signals from the antenna and processes the radar signals as echo signals. The receiving module 102 may amplify and filter the radar signal, and convert an analog radar signal into a digital reception signal. An echo signal may be hereinafter also referred to as echo.

Figure 2:
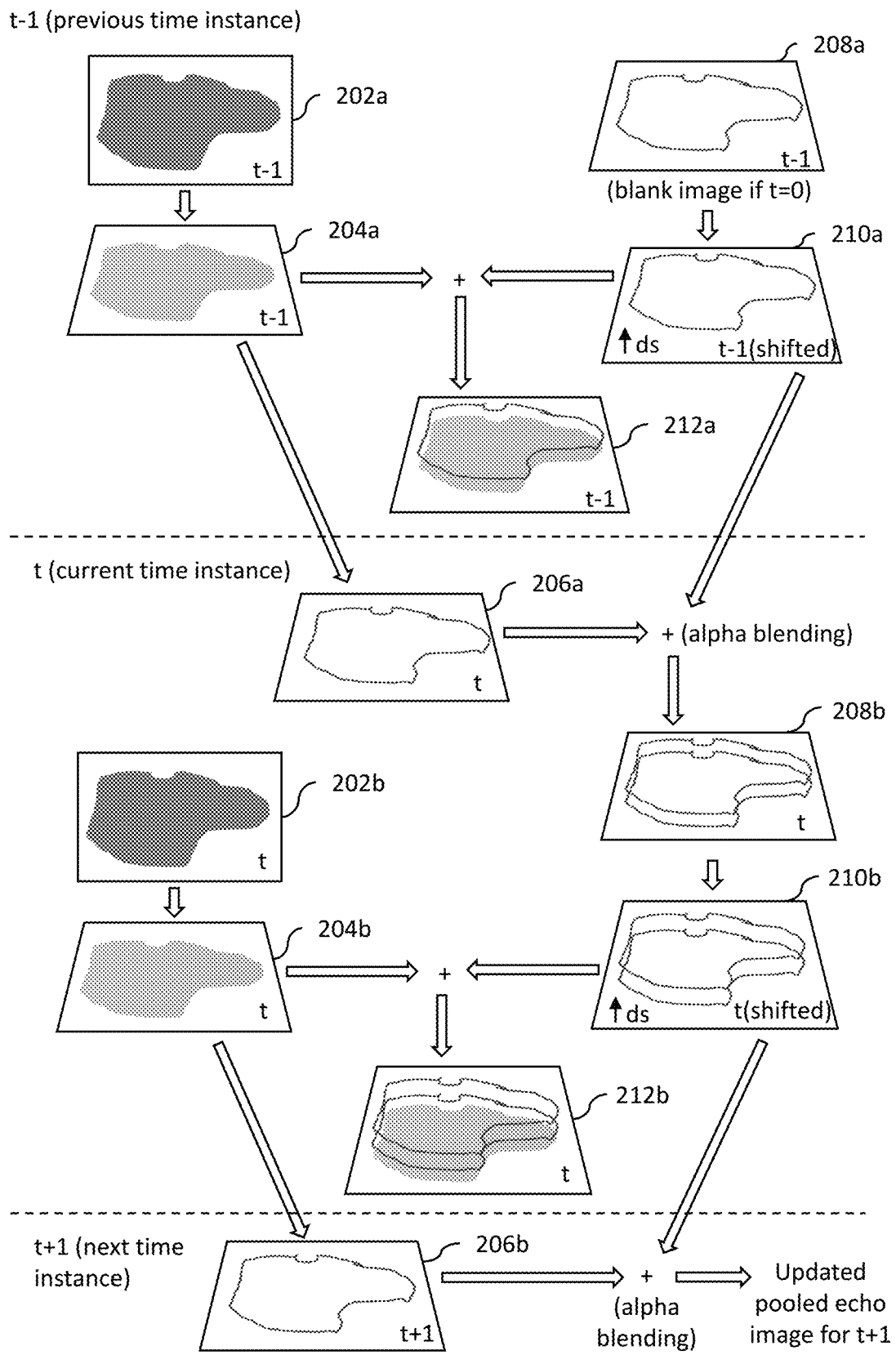
FIG. 2 illustrates echo images, projected echo images, transparent images, combined images, pooled echo images, and superimposed echo images at previous and current time instances.

Referring now to FIGS. 1 and 2, the projected image generator 104 includes an echo image acquisition module 116 that receives echo generated by the receiving module 102 at multiple time instances, and processes each echo to generate corresponding echo image, where each time instance corresponding to one complete 360° rotation of the antenna. In one example of the present disclosure, the echo image acquisition module 116 generates a first echo image 202a at a previous time instance t−1 (i.e., a first time instance), and a second echo image 202b at a current time instance t (i.e., a second time instance).

It will be apparent to a person skilled in the art that although in the current embodiment, each time instance corresponds to one complete 360° rotation of the antenna, the scope of the present disclosure is not limited to it. In various other embodiments, each time instance may correspond to less than 360° rotation of the antenna, without deviating from the scope of the present disclosure.

Referring to FIGS. 1 and 2, the projected image generator 104 further includes a projection conversion module 118 that generates first and second projected echo images 204a and 204b by projecting the first and second echo images 202a and 202b at current and previous time instances t−1 and t, respectively. The projected image generator 104 generates the first and second projected echo images 204a and 204b by projecting the first and second echo images 202a and 202b with respect to a predefined perspective projection angle θ on a perspective projection plane, based on information stored in the display parameter holding module 106 and the perspective projection module 108. Thus, the projected image generator 104 generates the first and second projected echo images 204a and 204b at the previous and current time instances t−1 and t, based on the echoes acquired at the previous and current time instances t−1 and t, respectively. The projection conversion module 118 provides the projected echo images generated at each time instance to the edge image generator 110 as well as to the superimposition generator 112.

Figure 3A:
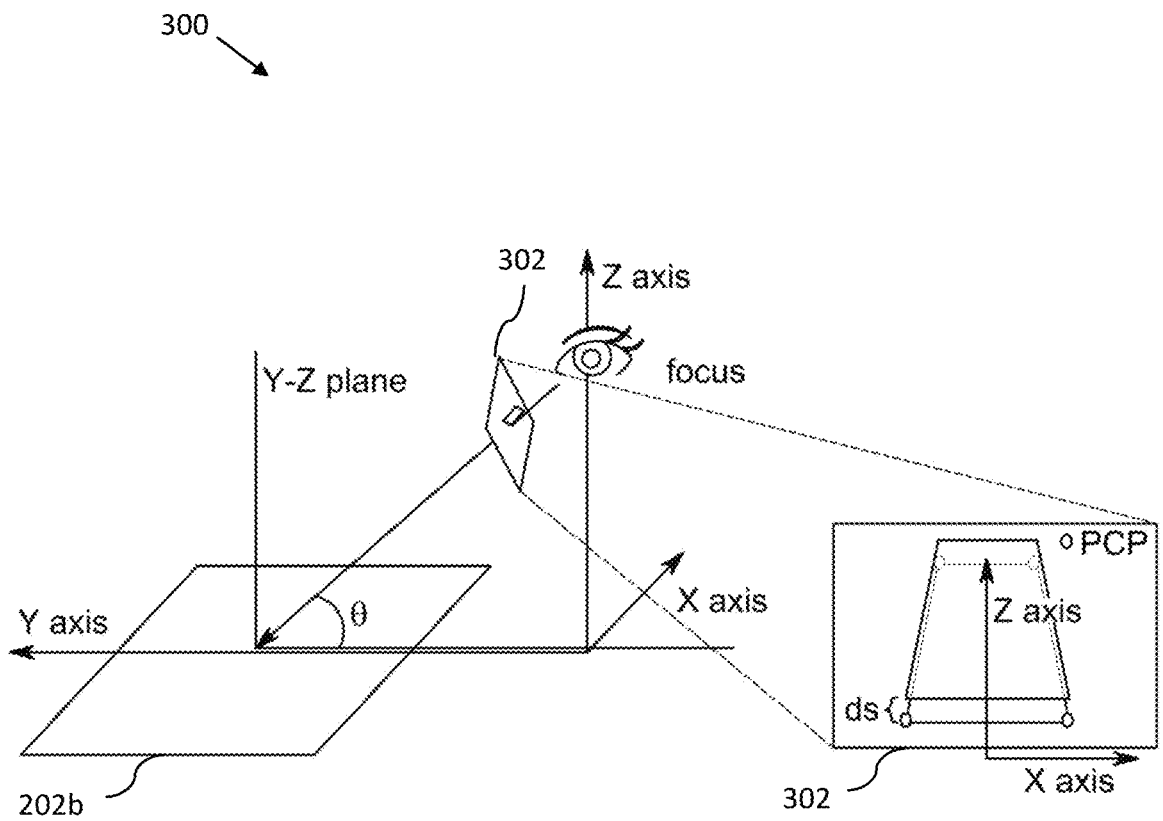
FIG. 3A illustrates a projection of the current echo image with respect to a predefined perspective projection angle in a perspective projection plane, in accordance with an embodiment of the present disclosure.

FIG. 3A illustrates the projection of the second echo image 202b with respect to the predefined perspective projection angle θ in a perspective projection plane 302, in accordance with an embodiment of the present disclosure. In the context of the present disclosure, the second echo image 202b is a plane two-dimensional echo image placed in a three-dimensional coordinate system with X, Y, and Z axes, such that the second echo image 202b is mapped onto the XY plane and the Y axis passes through a centre of the second echo image 202b.

The predefined perspective projection angle θ is an angle formed based on viewing of the second echo image 202b from a focal point coordinate on the Z-axis, i.e., a focus, such that the focus is at X=0. The predefined perspective projection angle θ indicates an angle at which the second echo image 202b is viewed with 90° above the center of the second echo image 202b. The perspective projection plane 302 is used to project the second echo image 202b with respect to the predefined perspective projection angle θ by way of a set of projection transformation coordinates (PCP) and an echo distance (ds). The projection transformation coordinates (PCP) include four coordinate points (1, 1), (1, w), (h, 1), and (h, w) corresponding to corners of the second echo image 202b mapped onto the perspective projection plane 302.

Referring to FIGS. 1, 2, and 3A together, the display parameter holding module 106 stores the predefined perspective projection angle θ, the focal point coordinate, a past echo interval, and image dimensions of each echo image such as the first and second echo images 202a and 202b including a height (h) and a width (w) of corresponding image.

The perspective projection module 108 receives the image dimensions of each echo image such as first and second echo images 202a and 202b, and corresponding focal point coordinates, the past echo interval, and the predefined perspective projection angle θ from the display parameter holding module 106, and determines the set of projection transformation coordinates (PCP) and the echo distance (ds) accordingly. The perspective projection module 108 further determines a set of projection transformation matrices based on the set of projection transformation coordinates (PCP).

The display parameter holding module 106 thus stores the set of projection transformation coordinates (PCP), the echo distance (ds), and the set of projection transformation matrices. In one embodiment, when the predefined perspective projection angle θ is modified, the perspective projection module 108 again determines the set of projection transformation coordinates (PCP), the echo distance (ds), and the set of projection transformation matrices based on the modified perspective projection angle, and provides the updated information to the display parameter holding module 106.

Referring now to FIGS. 1 and 2, the edge image generator 110 includes a 1/z block 120 that receives the first and second projected echo images 204a and 204b at the previous and current time instances t−1 and t respectively, and outputs the first and second projected echo images 204a and 204b at current and next time instances t and t+1 respectively.

It will be apparent to a person skilled in the art that although in the current embodiment, the edge image generator 110 includes the 1/z block 120 that time-shifts the outputting of the first and second projected echo images 204a and 204b, the scope of the present disclosure is not limited to it. In various other embodiments, the edge image generator 110 may include an alternative of the 1/z block 120.

The edge image generator 110 further includes a past echo pooling module 122 that receives the first and second projected echo images 204a and 204b from the 1/z block 120 at the current and next time instances t and t+1, respectively, and extracts edges of the first and second projected echo images 204a and 204b, using edge extraction to generate the first and second transparent images 206a and 206b at the current and next time instances t and t+1 respectively.

Further, the past echo pooling module 122 time shifts a previous combined image 208a based on the echo distance (ds) to generate a previous pooled echo image 210a. In the context of the present disclosure, the previous pooled echo image 210a is representative of a predefined number N of transparent images generated at multiple previous time instances, for example, t−2, t−3, t−4, t−5, . . . t−(N+1). Thus, the previous pooled echo image 210a is representative of enhanced edges, i.e., enhanced contours of the predefined number N of previous projected echo images. It will be understood by a person skilled in the art that for first iteration, i.e., when "t−1=0", the previous combined image 208a is a blank image and thus the previous pooled echo image 210a is a blank image as there are no transparent images from previous time instances.

It will be understood by a person skilled in the art that in the current embodiment, to time shift the previous combined image 208a, the past echo pooling module 122 shifts each pixel of the previous combined image 208a by the echo distance (ds) in the Z-axis (time axis) to generate the previous pooled echo image 210a. The superimposition generator 112 superimposes the previous pooled echo image 210a on the first projected image 204a to generate a superimposed image 212a at previous time instance t−1. Thus the superimposed image 212a is representative of the first projected echo image 204a and the previous pooled echo image 210a. The display module 114 displays the superimposed image 212a on a display device.

At the current time instance t, the past echo pooling module 122 updates the previous pooled echo image 210a using the first transparent image 206a through a pooling process to generate a current pooled echo image 210b.

Figure 3B:
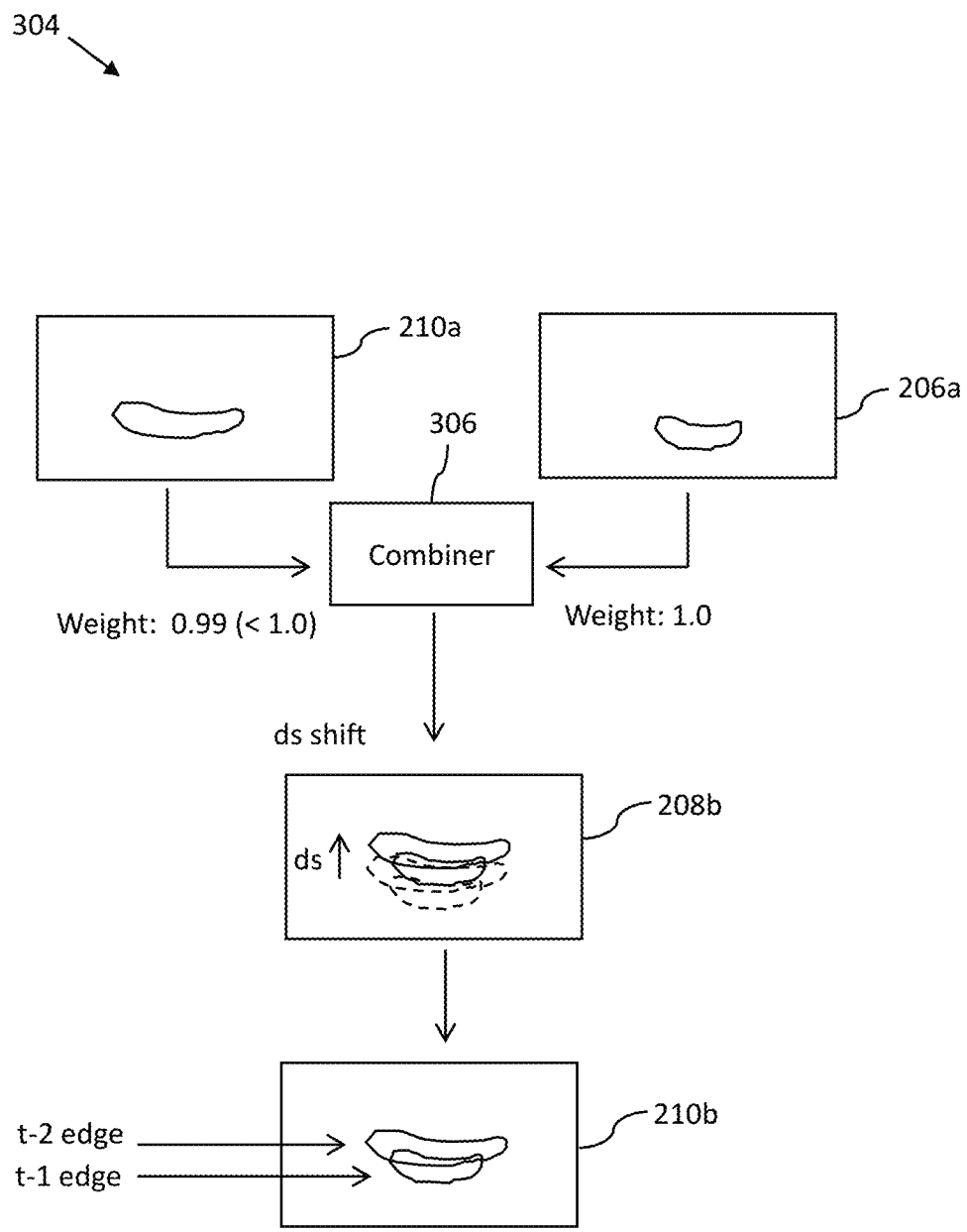
FIG. 3B illustrates a pooling process for the generation of the current pooled echo image by a past echo pooling module at the current time instance.

Referring now to FIGS. 1, 2, and 3B, a pooling process 304 is illustrated for updating the previous pooled echo image 210a with the first transparent image 206a at the current time instance t.

At current time instance t, the past echo pooling module 122 includes a combiner 306 that combines the previous pooled echo image 210a (generated at the previous time instance t−1) and the first transparent image 206a based on an alpha bending technique to generate the current combined image 208b.

In one embodiment of the present disclosure, based on the alpha blending technique, the luminance value $T_1$ of the previous pooled echo image 210a is represented by the following equation:

$$T_1 = 255 * \text{pow}(\beta 1, N) \quad (1)$$

Similarly, the luminance value $T_2$ of the first transparent image 206a is represented by the following equation:

$$T_2 = 255 * \text{pow}(\beta 2, N) \quad (2)$$

Where,

N=a pooling capacity of the past echo pooling module 122, i.e., the maximum predefined number of echo signals that may be combined together to form a pooled echo image $\beta 2$, $\beta 1$=weights assigned, such that $\beta 2 > \beta 1$ such that a luminance value of the previous pooled echo image 210a is less than a luminance value of the first transparent image 206a.

The luminance value of each echo image in the pooled echo image decreases with each time instance. The oldest image in the pooled echo image would have minimum luminance value.

The combiner 306 thus combines the previous pooled echo image 210a and the first transparent image 206a, and discards the echo image information of oldest echo image (i.e. of minimum luminance value) to generate the first combined image 208b. In one example, when $\beta 1$ is set to 0.99, and $\beta 2$ is set to 1, and N=10, the extracted edges of only previous N echoes (i.e., 10 echoes) obtained at previous N time instances (i.e., t−1 to t−10) with respect to the current time instance t are visible in the first combined image 208b, and the extracted edges of echoes obtained at time instances greater than N (i.e., echo acquired at time instance t−11) with respect to the current time instance t disappear (or are removed) from the first combined image 208b.

The past echo pooling module 122 further time shifts the extracted edges in the current combined image 208b by the echo distance (ds), to generate the current pooled echo image 210b. For example, referring to FIG. 3B, the past echo pooling module 122 shifts the extracted edges of the echoes acquired at the previous time instances t−1 and t−2 by the echo distance (ds). It will be apparent to a person skilled in the art that although in the current embodiment, the extracted edges of the echoes acquired at the previous time instances t−1 and t−2 are shown in FIG. 3B, the scope of the present disclosure is not limited to it. In various other embodiments, the extracted edges of the echoes acquired at N previous time instances (t−1 to t−N) may be shown in FIG. 3B, without deviating from the scope of the present disclosure.

It will be apparent to a person skilled in the art that although in the current embodiment, the previous pooled echo image 210a and the first transparent image 206a are combined based on an alpha blending technique, the scope of the present disclosure is not limited to it. In various other embodiments, the previous pooled echo image 210a and the first transparent image 206a may be combined based on any known blending technique, without deviating from the scope of the present disclosure.

At the current time instance t, the superimposition generator 112 superimposes the current pooled echo image 210b (generated at the current time instance t) on the second projected echo image 204b (generated at the current time instance t), to generate a current superimposed echo image 212b. In one embodiment, the superimposition generator 112 superimposes the current pooled echo image 210b on the second projected echo image 204b based on the alpha blending technique. However, the scope of the present disclosure is not limited to it, and any known technique may be used for superimposition.

At next time instance t+1, the second transparent image 204b generated at time instance t may be used for updating the current pooled echo image 210b to generate a next pooled echo image (not shown) for superimposing process at next time instance t+1.

In one embodiment, the image generating device 100 further includes a time calculator (not shown) that stores information regarding various time instances t−5, t−4, t−3, t−2, t−1, and so on, and provides the same to the superimposition generator 112.

It will be apparent to a person skilled in the art that although in the present embodiment, the time calculator determines the previous and current time instances t−1 and t, the scope of the present disclosure is not limited to it. In various other embodiments, the superimposition generator 112 is capable to determine/identify the previous and current time instances t−1 and t using any known technique, without deviating from the scope of the present disclosure.

Thus, at each time instance, the edge information corresponding to echoes acquired at multiple previous time instances are combined in a single image, the image generating device 100 is not required to store the echo images acquired at the multiple previous time instances. Thus, as the image generating device 100 is required to store only a single pooled echo image for N echoes, the memory required and a number of calculations required are significantly less than storing all the previous echo images and superimposing the multiple echo images in three dimensions. As a result, the processing speed of the image generating device 100 is improved. Additionally, a collision avoidance performance remains unaffected as information for the past several scans superimposed on a conventional planar display echo is displayed.

Figure 4:
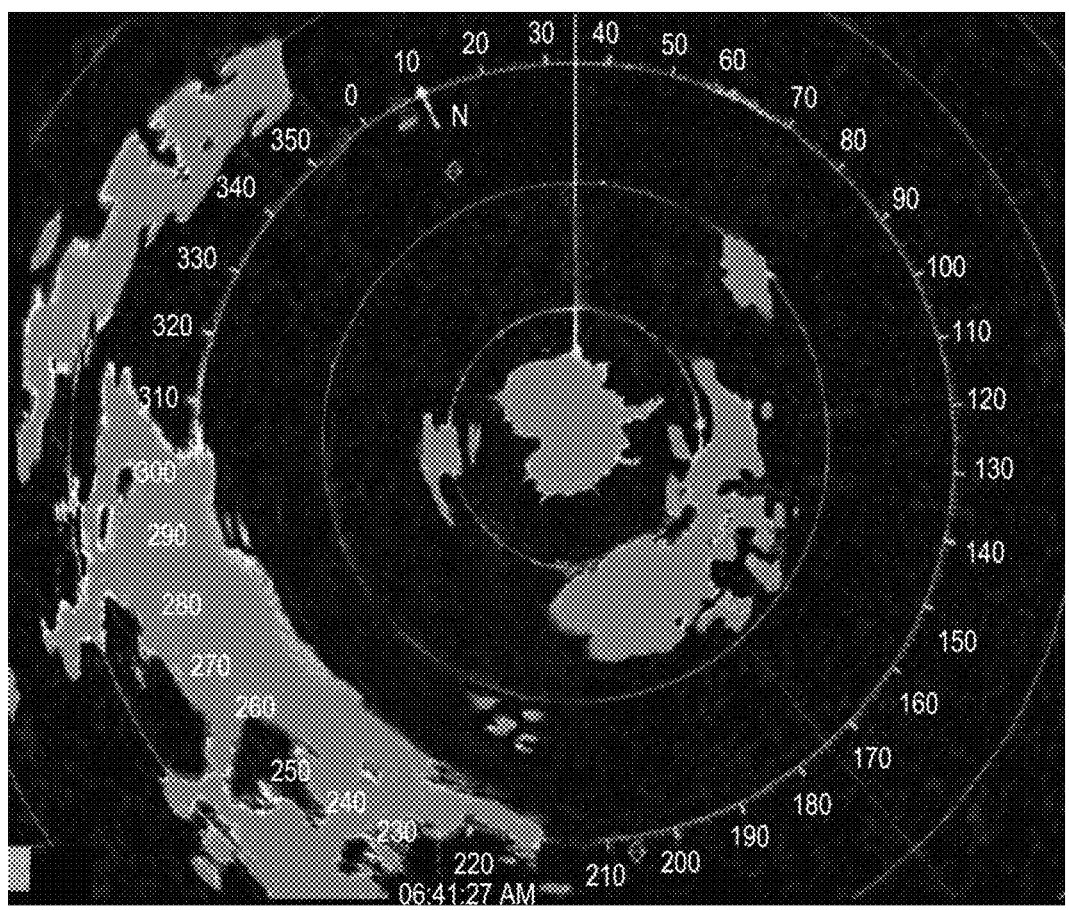
FIG. 4 illustrates an exemplary current echo image generated by an echo image acquisition module at a current time instance.

FIG. 4 illustrates an exemplary current echo image 400 (which is an example of the second echo image 202b) generated by the echo image acquisition module 116 at the current time instance t. The current echo image 400 is a two-dimensional image, that shows a plurality of targets around the radar.

Figure 5:
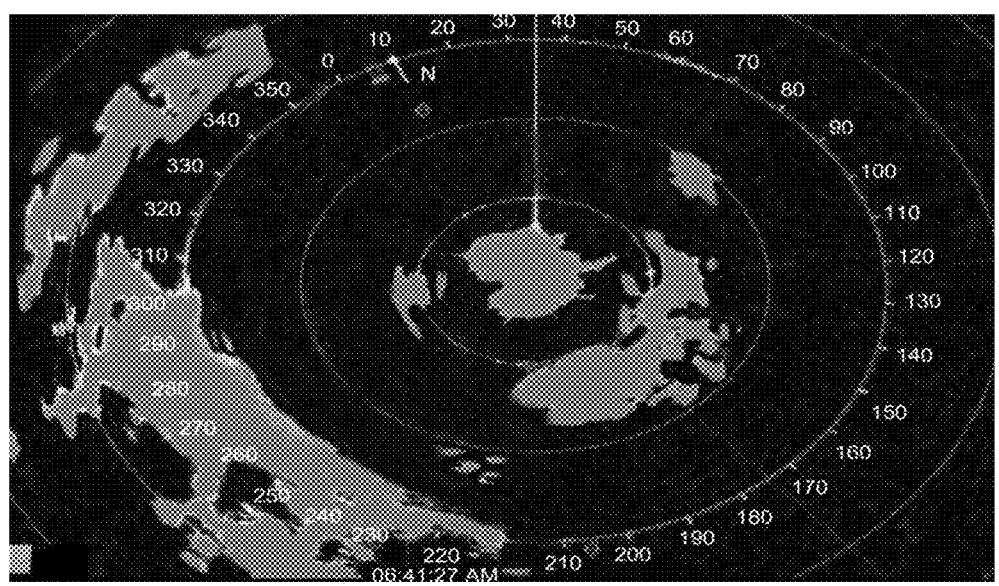
FIG. 5 illustrates an exemplary current projected echo image generated by a projection conversion module.

FIG. 5 illustrates an exemplary current projected echo image 500 (which is an example of the second projected echo image 204b) generated by a projection conversion module 118. The current projected echo image 500 is generated by projecting the current echo image 400 with respect to the predefined perspective projection angle θ.

Figure 6:
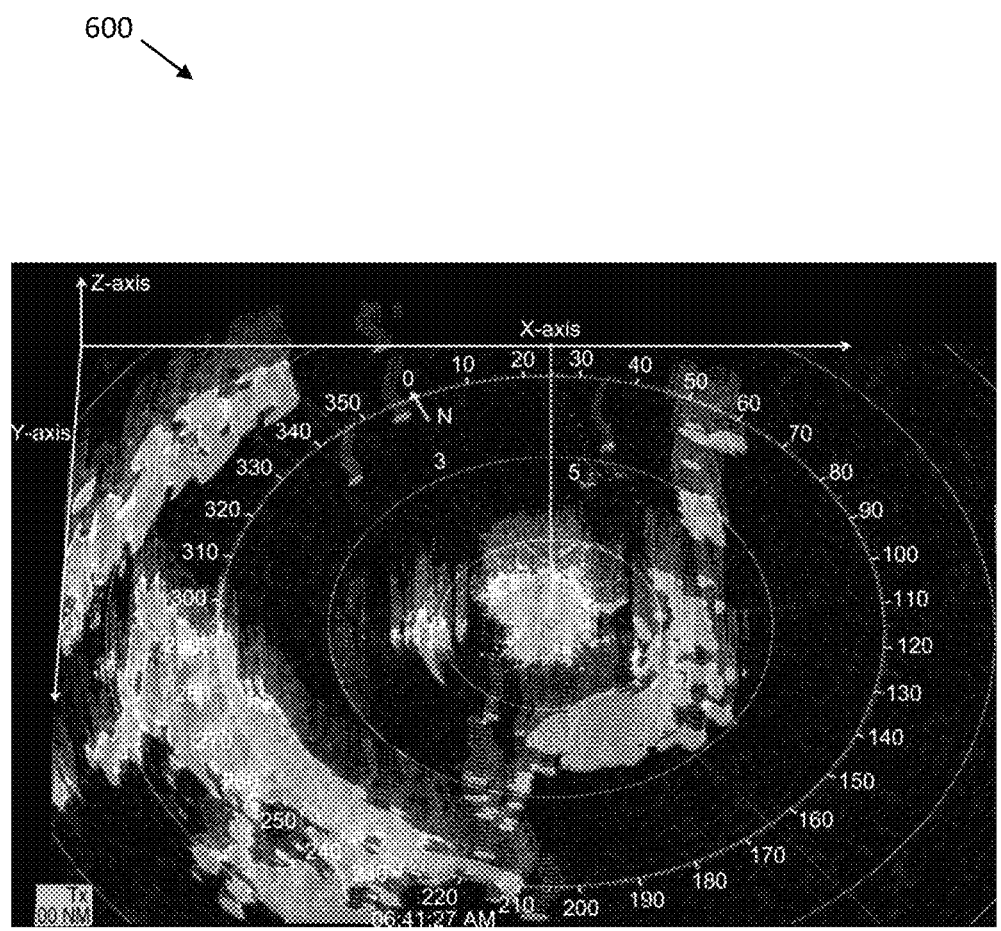
FIG. 6 illustrates an exemplary superimposed echo image when the perspective projection angle is 50°.

FIG. 6 illustrates an exemplary superimposed echo image 600 (which is an example of the current superimposed echo image 212b) when the perspective projection angle is 50°. The exemplary superimposed echo image 600 may be generated based on the current projected echo image 500.

Figure 7:
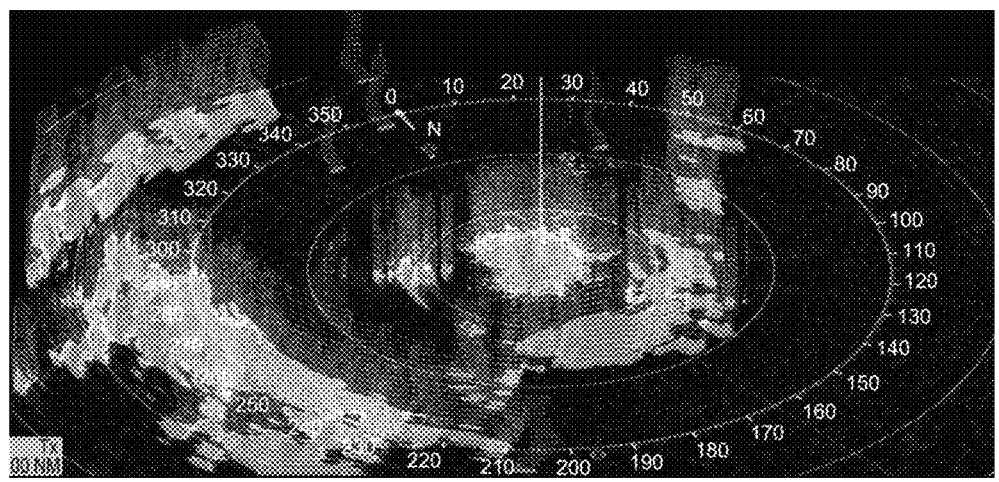
FIG. 7 illustrates another exemplary superimposed echo image when the perspective projection angle is 30°.

FIG. 7 illustrates another exemplary superimposed echo image 700 (another example of the current superimposed echo image 212b) when the perspective projection angle is 30°. The exemplary superimposed echo image 700 may be generated based on the current projected echo image 500.

It will be apparent to a person skilled in the art that the perspective projection angle may have any value other than 50° and 30°, without deviating from the scope of the present disclosure.

As shown in FIGS. 6 and 7, the superimposition generator 112 generates superimposed echo images 600 and 700 by arranging the projected echo image 500 and corresponding pooled echo image on a time axis, i.e., the Z axis, at the previous and current time instances t−1 and t, respectively. Herein, the echo distance (ds) is a distance between the arrangement of the pooled echo image and the projected echo image 500 on the Z axis as viewed from the perspective projection angle θ. The past echo interval is a time interval on the Z axis between the previous and current time instances t−1 and t associated with the projected echo image 500 and corresponding pooled echo image, based on which the echo distance (ds) is determined. Thus, each superimposed echo image 600 and 700 includes the projected echo image 500 superimposed with the extracted edges of previous N echoes acquired at previous N time instances with respect to the current time instance t. Thus, N number of extracted edges of previous echoes are superimposed in the Z axis direction, where Z=0 is a plane echo image that corresponds to the most recent echo.

Thus, each of the superimposed echo images 600 and 700 is utilized to monitor the change in object echo with time.

In an embodiment of the present disclosure, the image generating device 100 is implemented using a processor (processing circuitry) to perform the aforementioned processes. In one example, the processor has a central processing unit as Intel® Xeon® CPU E3-1245 v5 (3.5 Gigahertz 4 Core 8 Thread), an operating system as Windows 7 (64 bit), a memory of 16 Gigabyte, a programming language as Python 3.5.4. When the plane echo image size is 1050×1350 (RGB), the image generating device 100 implemented using the processor with aforementioned configurations requires 100 milliseconds to synthesize one echo.

Figure 8:
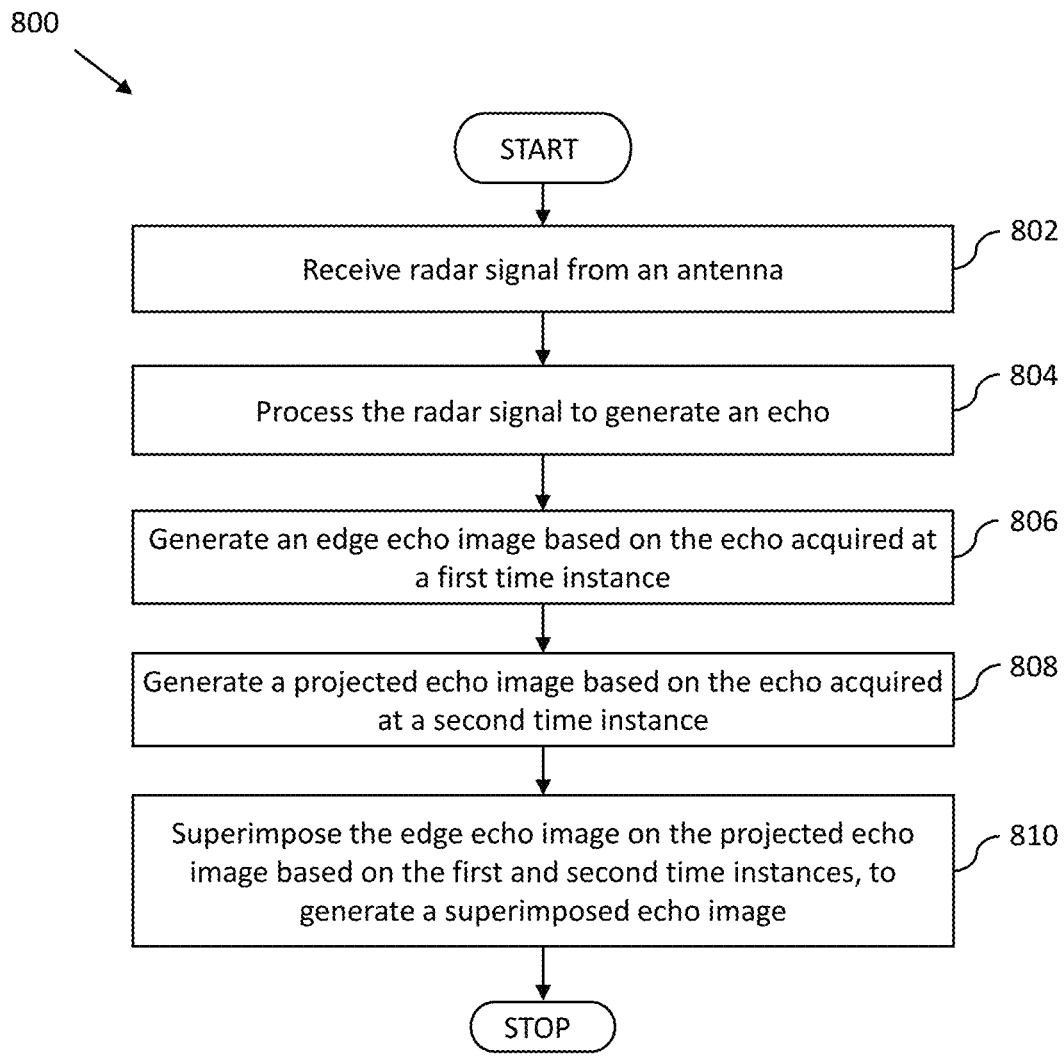
FIG. 8 is a flow chart illustrating an image generating method for the radar, in accordance with an embodiment of the present disclosure.

FIG. 8 is a flow chart illustrating an image generating method 800 for the radar, in accordance with an embodiment of the present disclosure. The method 800 has been illustrated with reference to FIGS. 1, 2, and 8.

At step 802, the radar signal is received from the antenna. At step 804, the radar signal is processed to generate the echo.

At step 806, the edge echo image, i.e., the current pooled echo image 210b is generated based on the echo acquired at the previous time instance t−1. The current pooled echo image 210b includes at least one transparent image with enhanced edges. At step 808, the second projected echo image 204b is generated based on the echo acquired at the current time instance t. The current projected echo image 500 is an example of the second projected image 204b. The current projected echo image 500 is the current echo image 400 projected with respect to the predefined perspective projection angle θ.

At step 810, the current pooled echo image 210b is superimposed on the second projected echo image 204b based on the previous and current time instances t−1 and t to generate the current superimposed echo image 212b. The superimposed echo image 600 or 700 is an example of the current superimposed echo image 212b.

It is to be understood that not necessarily all objectives or advantages may be achieved in accordance with any particular embodiment described herein. Thus, for example, those skilled in the art will appreciate that certain embodiments may be configured to operate in a manner that achieves or optimizes one advantage or group of advantages as taught herein without necessarily achieving other objectives or advantages as may be taught or suggested herein.

All processes described herein may be embodied in, and fully automated via, software code modules executed by a computing system that includes one or more computers or processors. The software code modules may be stored in any type of non-transitory computer-readable medium or other computer storage device. Some or all methods may be embodied in specialized computer hardware.

Many other variations other than those described herein will be apparent from this disclosure. For example, depending on the embodiment, certain actions, events, or functions of any of the algorithms described herein may be performed in different sequences, and may be added, merged, or excluded altogether (e.g., not all described actions or events are required to execute the algorithm). Moreover, in certain embodiments, operations or events are performed in parallel, for example, through multithreading, interrupt handling, or through multiple processors or processor cores, or on other parallel architectures, rather than sequentially. In addition, different tasks or processes can be performed by different machines and/or computing systems that can work together.

The various exemplary logical blocks and modules described in connection with the embodiments disclosed herein can be implemented or executed by a machine such as a processor. The processor may be a microprocessor, but alternatively, the processor may be a controller, a microcontroller, or a state machine, or a combination thereof. The processor can include an electrical circuit configured to process computer executable instructions. In another embodiment, the processor includes an application specific integrated circuit (ASIC), a field programmable gate array (FPGA), or other programmable device that performs logical operations without processing computer executable instructions. The processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, the processor may also include primarily analog components. For example, some or all of the signal processing algorithms described herein may be implemented by analog circuitry or mixed analog and digital circuitry. A computing environment may include any type of computer system, including, but not limited to, a computer system that is based on a microprocessor, mainframe computer, a digital signal processor, a portable computing device, a device controller, or a computing engine within the device.

Unless otherwise stated, conditional languages such as "can", "could", "will", "might", or "may" are understood within the context as used in general to convey that certain embodiments include, while other embodiments do not include, certain features, elements and/or steps. Thus, such conditional languages are not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive languages, such as the phrase "at least one of X, Y, or Z", unless specifically stated otherwise, is understood with the context as used in general to present that an item, term, etc., may be either X, Y, or Z, or any combination thereof (e.g., X, Y, and/or Z). Thus, such a disjunctive language is not generally intended to, and should not, imply that certain embodiments require at least one of X, at least one of Y, or at least one of Z to each be present.

Any process descriptions, elements, or blocks in the flow diagrams described herein and/or shown in the accompanying drawings should be understood as potentially representing modules, segments, or parts of code, including one or more executable instructions for implementing a particular logical function or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations", without other modifiers, typically means at least two recitations, or two or more recitations).

It will be understood by those within the art that, in general, terms used herein, are generally intended as "open" terms (e.g., the term "including" should be interpreted as "including but not limited to", the term "having" should be interpreted as "having at least", the term "includes" should be interpreted as "includes but is not limited to", etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface". The term "vertical" refers to a direction perpendicular to the horizontal as just defined. Terms such as "above", "below", "bottom", "top", "side", "higher", "lower", "upper", "over", and "under", are defined with respect to the horizontal plane.

As used herein, the terms "attached", "connected", "mated" and other such relational terms should be construed, unless otherwise noted, to include removable, moveable, fixed, adjustable, and/or releasable connections or attachments. The connections/attachments can include direct connections and/or connections having intermediate structure between the two components discussed.

Numbers preceded by a term such as "approximately", "about", and "substantially" as used herein include the recited numbers, and also represent an amount close to the stated amount that still performs a desired function or achieves a desired result. For example, the terms "approximately", "about", and "substantially" may refer to an amount that is within less than 10% of the stated amount. Features of embodiments disclosed herein preceded by a term such as "approximately", "about", and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

Terminology

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiment disclosed herein can be implemented or performed by a machine, such as a processor. A processor can be a microprocessor, but in the alternative, the processor can be a controller, microcontroller, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface". The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated," and other such relational terms should be construed, unless otherwise noted, to include removable, movable, fixed, adjustable, and/or releasable connections or attachments. The connections/attachments can include direct connections and/or connections having intermediate structure between the two components discussed.

Unless otherwise explicitly stated, numbers preceded by a term such as "approximately", "about", and "substantially" as used herein include the recited numbers, and also represent an amount close to the stated amount that still performs a desired function or achieves a desired result. For example, unless otherwise explicitly stated, the terms "approximately", "about", and "substantially" may refer to an amount that is within less than 10% of the stated amount. Features of embodiments disclosed herein preceded by a term such as "approximately", "about", and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. An image generating device for a radar, comprising:
processing circuitry configured to:
   receive a radar signal from an antenna and process the radar signal to acquire an echo at a first time instance and an echo at a second time instance;
   generate an edge echo image based on the echo acquired at the first time instance;
   generate a projected echo image based on the echo acquired at the second time instance;
   superimpose the edge echo image on the projected echo image based on the first and second time instances, to generate a superimposed echo image;
   store the edge echo image as a previous pooled echo image;
   generate a current transparent image of the projected echo image using edge extraction; and
   combine the previous pooled echo image with the current transparent image to generate a current pooled echo image, such that the current pooled echo image includes a plurality of extracted edges of a plurality of previous echoes acquired at a corresponding plurality of previous time instances, and use the current pooled echo image for superimposing on a next echo image acquired at a time instance next to the second time instance.

2. The image generating device according to claim 1, wherein the processing circuitry is further configured to arrange the edge echo image and the projected echo image on a time axis at the first time instance and the second time instance, respectively, to generate the superimposed echo image.

3. The image generating device according to claim 2, wherein the edge echo image is a transparent image with enhanced edges.

4. The image generating device according to claim 3, wherein the processing circuitry is further configured to:
generate a current echo image based on the echo acquired at the second time instance; and project the current echo image with respect to a predefined perspective projection angle, to generate the projected echo image.

5. The image generating device according to claim 4, wherein the processing circuitry is further configured to store at least one of: the predefined perspective projection angle, a past echo interval indicating a time interval between the first and second time instances, an echo pooling information of an edge image generator, image dimensions of the current echo image, an echo distance between an arrangement of the edge and projected echo images on a time axis, a set of projection transformation coordinates associated with the projected echo image, and a set of projection transformation matrices associated with the projected echo image.

6. The image generating device according to claim 1, wherein the edge echo image is a transparent image with enhanced edges.

7. The image generating device according to claim 6, wherein the processing circuitry is further configured to:
generate a current echo image based on the echo acquired at the second time instance; and
project the current echo image with respect to a predefined perspective projection angle, to generate the projected echo image.

8. The image generating device according to claim 7, wherein the processing circuitry is further configured to store at least one of: the predefined perspective projection angle, a past echo interval indicating a time interval between the first and second time instances, an echo pooling information of an edge image generator, image dimensions of the current echo image, an echo distance between an arrangement of the edge and projected echo images on a time axis, a set of projection transformation coordinates associated with the projected echo image, and a set of projection transformation matrices associated with the projected echo image.

9. The image generating device according to claim 8, wherein the projected echo image includes the current echo image that is projected with respect to the predefined perspective projection angle on a perspective projection plane based on the set of projection transformation matrices.

10. The image generating device according to claim 6, wherein the processing circuitry is further configured to replace the edge echo image with the superimposed echo image after generating the superimposed echo image.

11. The image generating device according to claim 1, wherein the processing circuitry is further configured to replace the edge echo image with the superimposed echo image after generating the superimposed echo image.

12. The image generating device according to claim 11, wherein the projected echo image includes a current echo image that is projected with respect to a predefined perspective projection angle on a perspective projection plane based on a set of projection transformation matrices.

13. The image generating device according to claim 1, wherein a luminance value associated with the previous pooled echo image is less than a luminance value associated with the current transparent image.

14. The image generating device according to claim 1, wherein a past echo pooling module combines the previous pooled echo image, and the current transparent image, based on an alpha blending technique.

15. The image generating device according to claim 14, wherein the current pooled echo image includes edge information of at most N number of previous echoes.

16. The image generating device according to claim 1, wherein the processing circuitry is further configured to display the superimposed echo image.

17. The image generating device according to claim 1, wherein the processing circuitry is further configured to calculate the first and second time instances.

18. An image generating method for a radar, comprising:
receiving a radar signal from an antenna;
processing the radar signal to acquire an echo at a first time instance and an echo at a second time instance;
generating an edge echo image based on the echo acquired at the first time instance;
generating a projected echo image based on the echo acquired at the second time instance;
superimposing the edge echo image on the projected echo image based on the first and second time instances, to generate a superimposed echo image;
storing the edge echo image as a previous pooled echo image;
generating a current transparent image of the projected echo image using edge extraction; and
combining the previous pooled echo image with the current transparent image to generate a current pooled echo image, such that the current pooled echo image includes a plurality of extracted edges of a plurality of previous echoes acquired at a corresponding plurality of previous time instances, and use the current pooled echo image for superimposing on a next echo image acquired at a time instance next to the second time instance.

19. A non-transitory computer readable medium having stored thereon computer-executable instructions which, when executed by a computer, cause the computer to:
receive a radar signal from an antenna;
process the radar signal to acquire an echo at a first time instance and an echo at a second time instance;
generate an edge echo image based on the echo acquired at the first time instance;
generate a projected echo image based on the echo acquired at the second time instance;
superimpose the edge echo image on the projected echo image based on the first and second time instances, to generate a superimposed echo image;
store the edge echo image as a previous pooled echo image;
generate a current transparent image of the projected echo image using edge extraction; and
combine the previous pooled echo image with the current transparent image to generate a current pooled echo image, such that the current pooled echo image includes a plurality of extracted edges of a plurality of previous echoes acquired at a corresponding plurality of previous time instances, and use the current pooled echo image for superimposing on a next echo image acquired at a time instance next to the second time instance.

* * * * *